SURGE PROTECTED TRANSISTOR OPERATED SERVO SYSTEM

Filed Feb. 9, 1960 2 Sheets-Sheet 1

INVENTOR.
CHARLES E. MARSHALL
BY Alfred W. Barber
ATTORNEY

SURGE PROTECTED TRANSISTOR OPERATED SERVO SYSTEM

Filed Feb. 9, 1960 2 Sheets-Sheet 2

INVENTOR.
CHARLES E. MARSHALL
BY Alfred W. Barber
ATTORNEY 3,043,997
SURGE PROTECTED TRANSISTOR OPERATED SERVO SYSTEM

Charles E. Marshall, Port Washington, N.Y., assignor to Potter Instrument Co. Inc., Plainview, N.Y., a corporation of New York Filed Feb. 9, 1960, Ser. No. 7,627
10 Claims. (Cl. 318—28)

The present invention is a continuation-in-part of the application for Letters Patent entitled Transistor Operated Servo System of Charles E. Marshall, filed on June 28, 1957 and bearing Serial Number 668,729, now abandoned.

The present invention concerns servo amplifiers and, in particular, servo amplifiers utilizing transistors.

Servo motors are well-known devices with many uses in the electrical field. The servo system to be described is one in which the servo motor is driven forward or backward in response to a control signal. When the control signal is zero, the motor stands still but the motor rotates in either direction, depending on whether a positive or a negative control signal is fed to its amplifier. The purpose of the amplifier is to amplify a control signal and to control power to the servo motor in one phase in response to one polarity of control signal and in the opposite phase in response to the other polarity of control signal.

In a system where the control signal is applied or reversed suddenly, large amounts of power are required momentarily. It has been found that transistors may be utilized in the servo amplifier and power supply to the servo motor with considerable saving in space and weight of such equipment and with a substantial increase in efficiency.

In order to make the transistor amplifier and power source for a servo motor feasible it has been found, according to the present invention, that transients in the system could be effectively dealt with as will be set forth below. When a servo motor is suddenly started and particularly when it is suddenly reversed, relatively large amounts of momentary power are required and that in consequence large transients are often set up in the system.

It has been found, according to the present invention, that these transients may be greatly reduced and hence the power handling capacity of the system greatly increased by suitable feed-back circuits. It has ben found particularly important to reduce large amplitude, short duration spikes of transient current which may be damaging to the transistors in the power supply part of the circuit.

Accordingly one object of the present invention is to provide a servo amplifier and motor drive power supply which is much smaller and more efficient than those hitherto available.

Another object is to provide a servo amplifier and motor drive power supply in which transistors may be effectively and efficiently used.

Still another object is to provide an effective transient current and voltage reducer in a transistor amplifier and power supply circuit.

These and other objects will be apparent from the detailed description of the invention given in connection with the figure of the drawing.

Figure 1:
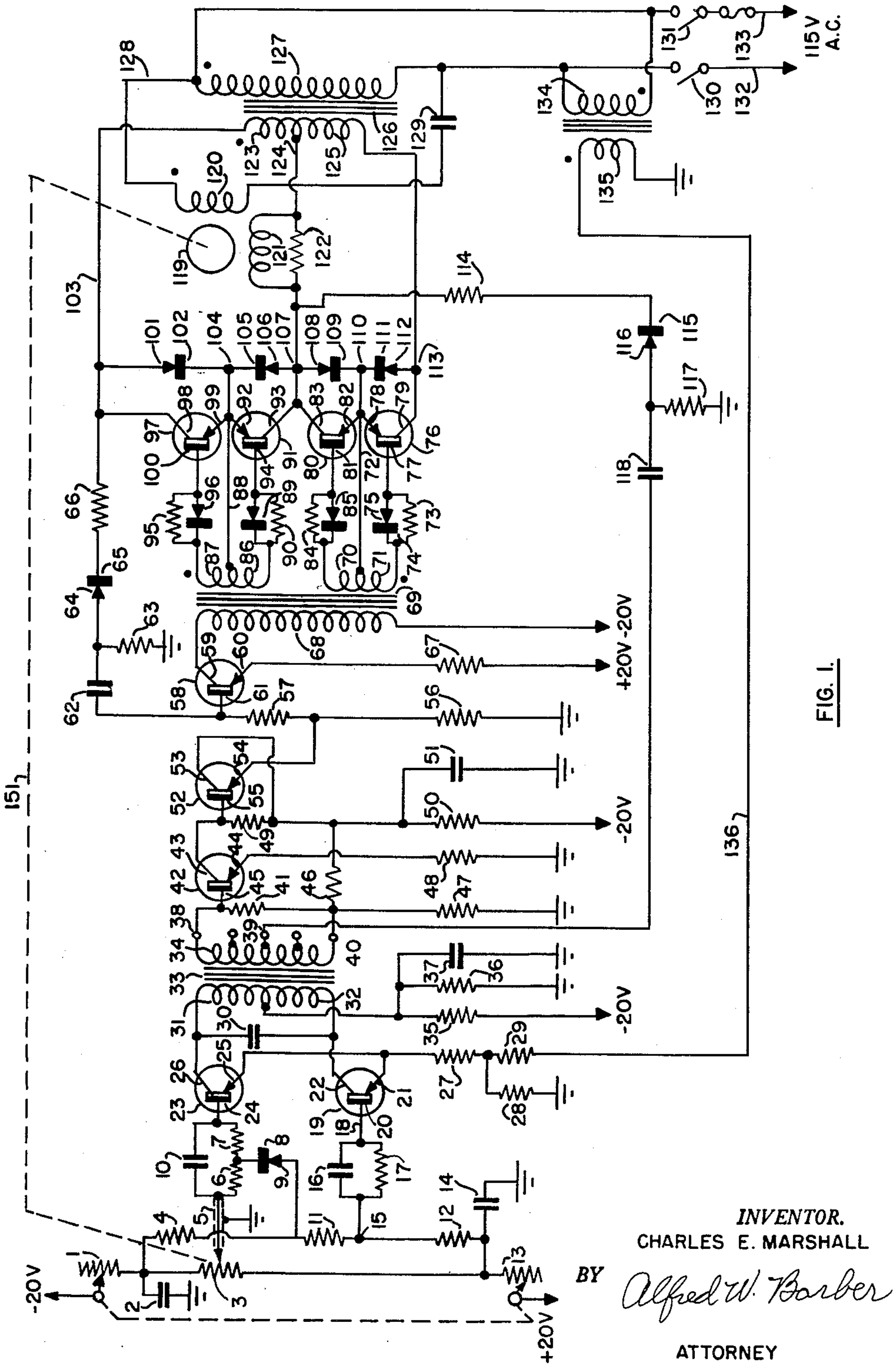
FIG. 1 shows a complete circuit of a transistor servo system in accordance with the present invention.

A control signal may be generated in any desired manner, for instance, from the position of the variable contact on potentiometer 3 in FIG. 1. A negative bias is supplied through variable resistor 1 from a suitable source of negative bias, not shown, to one end of potentiometer 3 and a positive bias through variable resistor 13 from a suitable source, not shown, to the other end of potentiometer 3 and adjusted so that, for example, the mechanical center of potentiometer 3 yields zero output voltage. This center position of potentiometer 3 then represents the point of zero input to the servo amplifier and the system is at rest. One end of potentiometer 3 is bypassed to ground by capacitor 2 and the other end by capacitor 14. A fixed voltage divider consisting of resistors 4, 11 and 12 is connected across potentiometer 3. The variable contact arm of potentiometer 3 is connected over lead 5 through a rate-of-change control circuit consisting of capacitor 10 shunted by resistors 6 and 7 in series to base 24 of transistor 23. A fixed reference is derived from the junction point 15 between resistors 11 and 12 and is applied through resistor 17 shunted by capacitor 16, to duplicate the rate-of-change circuit, over lead 18 to base 20 of transistor 19. Emitter 25 of transistor 23 is connected to emitter 21 of transistor 19, and to resistors 27 and 28 in series to ground. A 60 cycle signal is derived from secondary 135 of transformer 134—135 which is connected over lead 136 through resistor 29, across resistor 28, and through resistor 27 to emitters 21 and 25. Collector 26 is connected to one end of center-tapped primary 31—32 while collector 22 is connected to the other end. Capacitor 30 is connected across primary 31—32 and the center-tap is connected to a minus 20 volt bias supply, not shown, through series resistor 35. Resistor 36 shunted by capacitor 37 connected to the center-tap acts to reduce the actual bias applied to collectors 22 and 26 to a suitable value and effectively decouples them from the bias supply to prevent feed back. Transformer 33 has a secondary 34 which receives the differential of the primary voltages from 38 to 40 which is applied from base 45 to ground through resistor 47. Transistor 42 acts as an amplifier of the differential primary signal voltages. Emitter 44 is connected through stabilizing resistor 48 to ground. Base 45 receives its bias from the minus 20 volt source through resistors 50 and 46 and across resistor 41. Capacitor 51 acts as a decoupling filter capacitor with resistor 50. Resistor 41 is used to load secondary 34. Collector 43 is connected through load resistor 49 and decoupling filter resistor 50 to minus 20 volt bias source. Collector 43 is also direct coupled to base 55 of transistor 52 which in turn is connected in a common collector circuit. Emitter 54 is connected through load resistor 56 to ground. Collector 53 is connected to the low end of resistor 49. Driver transistor 58 has base 61 connected through current limiting resistor 57 to emitter load resistor 56, emitter 60 connected through current limiting resistor 67 to a plus twenty volt bias source, not shown, and collector 59 connected through primary 68 to the minus twenty volt bias source.

Up to this point a transistor amplifier and differential system has been described which provides a 60 cycle signal of phase and magnitude dependent on how much and in which direction the variable contact on potentiometer 3 departs from a predetermined point. Transistors 19 and 23 are energized more or less depending on the position of the variable contact on potentiometer 3 and serve to determine the relative voltages across primaries 31 and 32. The voltage that predominates determines which phase of 60 cycle voltage and the amplitude supplied to the remainder of the amplifier. Transistor 42, 52 and 58 further amplify the 60 cycle unbalance signal and apply it to primary 68.

Figure 3:
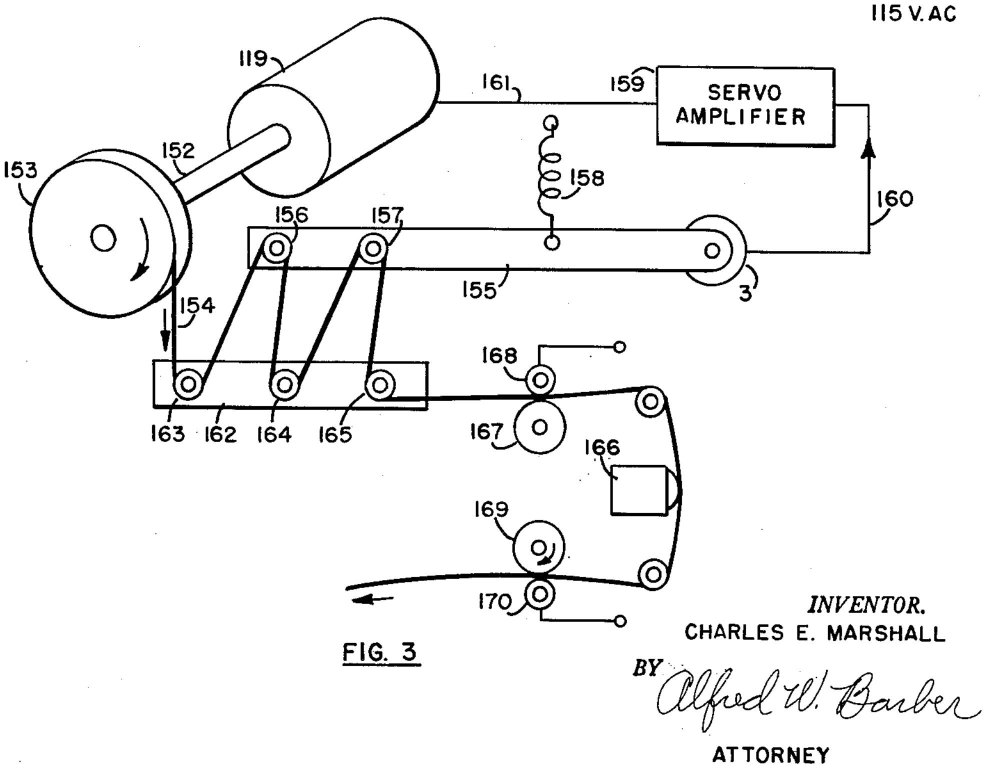
FIG. 3 shows a block diagram of a servo system according to the present invention.

The signal thus produced across primary 68 will be a 60 cycle current the phase of which will depend on the position of the contact arm on potentiometer 3. Servo motor 119 is driven by current from secondaries 123 and 125 of transformer 123—125—127. When the phase of current in secondary 86—87 is in phase with current from the half secondary 123, power will be supplied through transistors 91 and 97 to series winding 121 in a phase relation to current in winding 120 to cause motor 119 to rotate in one direction and similarly, when current in secondary 70—71 is in phase with current from half secondary 125, motor 119 due to the phase of current in winding 121 with respect to winding 120 will rotate in the opposite direction. These rotations are in such direction as to restore the contact arm of potentiometer 3 to mid-position (see FIG. 3). The position of the contact arm of potentiometer 3 depends on the position of motor 119 as indicated by the dotted connection 151. While this system may be used as a follow-up in many different ways, one particular way is shown in FIG. 3.

The servo motor drive includes servo motor 119 having reference winding 120 connected through phase shift (90 degrees) capacitor 129 and over lead 128 to 60 cycle (or other) line 132—133 through switches 130—131; control winding 121 connected between the center tap 124 on secondary 125 of power transformer 123—126 also connected to the 60 cycle source and current control transistors 76—80—91—97 and motor 119.

Transistor 76 includes base 77, emitter 78 and collector 79. Transistor 80 includes base 81, emitter 82 and collector 83. Transistor 91 includes base 94, emitter 92 and collector 93. Transistor 97 includes base 100, emitter 99 and collector 98. Transistors 76 and 80 receive power from transformer winding 125 through motor control winding 121 over lead 124. Control voltage on bases 77 and 81 is derived from secondary 70—71 through limiitng circuits consisting of diode 74—75 shunted by resistor 73 and diode 85 shunted by resistor 84 respectively and over lead 72. The diode resistor combinations are proportioned to prevent thermal "run-away." Similarly transistors 91 and 97 receive power from winding 123 over leads 103 and 124 and through servo motor control winding 121 and base control voltage from coils 86 and 87 over lead 88 and through diode 89 shunted by resistor 90 and diode 96 shunted by resistor 95. Diodes 101—102, 105—106, 108—109 and 111—112 are so connected across transistors 97, 91, 80 and 76 respectively that they supply current paths to the conducting transistors at any given time while preventing reverse voltage from being applied to the non-conducting transistors. For example, when transistor 97 is non-conducting and transistor 91 is conducting, diode 101—102 supplies current to 91 and shunts 97. Surges across transformer 126 which may adversely affect the operation of the transistors are fed back degeneratively to base 61 of transistor 58 through resistor 66, diode 64—65 and capacitor 62 and across resistor 63. Also surges across control winding 121 are fed back degeneratively to tap 39 through resistor 114, diode 115—116 and capacitor 118 and across resistor 117. These two feed back circuits serve to damp out surges due to sudden changes in line voltage and sudden changes in servo motor control current affording considerable protection against the effect of such surges in the transistors.

Figure 2:
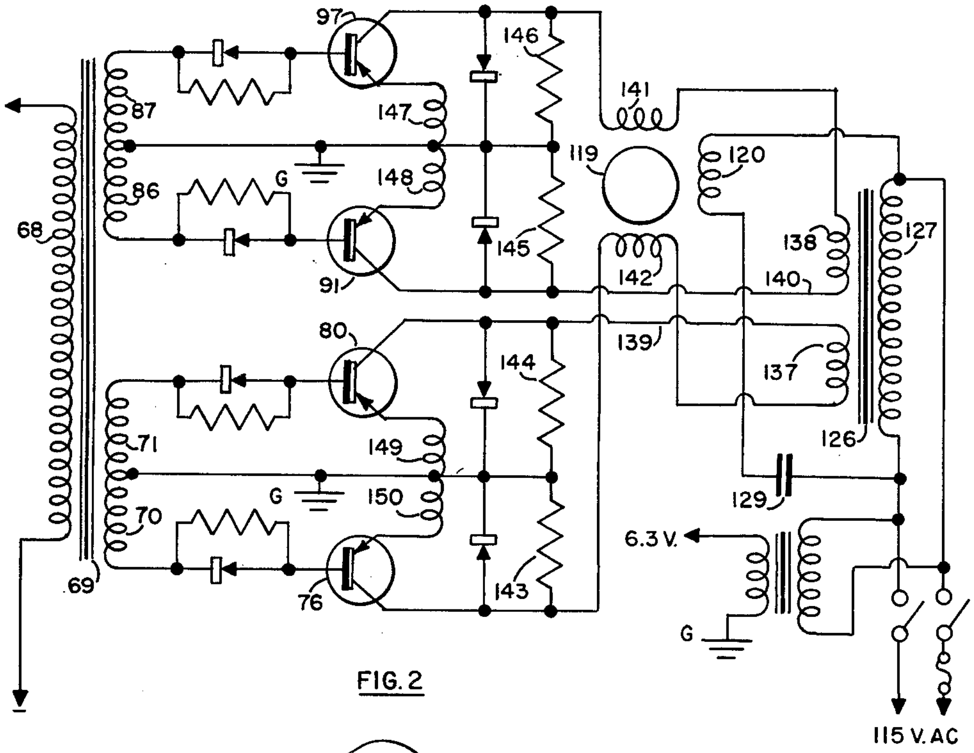
FIG. 2 shows a modified form of a portion of the invention.

FIG. 2 shows a modified form of the power transistor drive and servo motor circuit. The same numbers have been assigned to parts in FIG. 2 which correspond to similarly-functioning parts in FIG. 1. However, in FIG. 2 two control windings 141 and 142 fed from split transformer windings 137 and 138 over leads 139 and 140 are provided. This separates the transistor circuits into two groups of two each which provides improved safety since surges in one group are thus prevented from flowing in the other group. Additionally increased safety is provided by means of inductors 147, 148, 149 and 150 in series with the emitters and resistors 146, 145, 144 and 143 in shunt with transistors 97, 91, 80 and 76 respectively. These means when combined with the safety devices described in connection with FIG. 1 provide a transistor operated servo system with very efficient operating characteristics.

FIG. 3 shows a servo system according to the present invention in which motor 119 and potentiometer 3 are as shown in FIGS. 1 and 2. Servo amplifier 159 connected between the error indicating potentiometer 3 and servo motor 119 by leads 160 and 161 is the complete circuit as shown in FIG. 1. In the application here shown, magnetic tape 154 drawn from reel 153 passes over rollers 156 and 157 carried by arm 155, rollers 163, 164 and 165 carried by stationary arm 162 between drive capstan 167 and its pinch roller 168, over recording/playback head 166, between drive capstan 169 and its pinch roller 170 and on to a further similar loop system and reel, not shown. Assume pinch roller 170 is activated toward capstan 169 providing pull on tape 154, tape 154 will be drawn from reel 153 and thru the system described above and in the direction arrows. As the tape is drawn, arm 155 will be pulled downward against the restoring force of spring 158 and the arm of potentiometer 3 which is attached to arm 155 will be displaced from its normal null position. This displacement will transmit an error signal to servo amplifier 159 over lead 160 as described above and servo motor 119 will be rotated by the phased amplifier output current over lead 161 turning shaft 152 and its attached reel 153 in such a direction as to relieve the tension on tape 154 allowing arm 155 to rise and restoring the arm of potentiometer 3 to its null position. This feed-back loop is indicated by dotted line 151 in FIG. 1.

While only one embodiment of the present invention has been shown and described together with one modification, many modifications will be apparent to those skilled in the art and within the spirit and scope of the invention as set forth specifically in the appended claims.

What is claimed is:

1. In a servo drive system, the combination comprising,
a reference source of electrical potential to produce a reference current,
a differential source of electrical potential for producing a differential current responsive to a variation of a controlled device from a predetermined position,
means for comparing a differential current with said reference current to produce an unbalance current when said variation of a controlled device from a predetermined position occurs, and
at least one power transistor connected to operate in a switching mode in response to said unbalance current to drive an A.C. servo motor coupled to said controlled device.

2. In a servo drive system, the combination comprising,
a reference source of electrical potential to produce an electrical current,
a differential source of electrical potential for producing a differential current responsive to a variation of a controlled device from a predetermined position,
means for comparing a differential current with said reference current to produce an unbalance current when said variation of a controlled device from a predetermined position occurs, and
at least two transistors connected in inverted series to operate in a switching mode in response to said unbalance current to drive an A.C. servo motor coupled to said controlled device.

3. In a servo drive system, the combination comprising,
a reference source of electrical potential to produce a reference current, a differential source of electrical potential for producing a differential current responsive to a variation of a controlled device from a predetermined position, means for comparing a differential current with said reference current to produce an unbalance current when said variation of a controlled device from a predetermined position occurs, a plurality of power transistors connected to operate in a switching mode in response to said unbalance current to drive an A.C. servo motor coupled to said controlled device, and two inverted series-connected diodes connected in parallel with each of said transistors to shunt reverse current from said transistors.

4. In a servo drive system as set forth in claim 3 including feed back connection means to limit the magnitude of current surges.

5. In a servo drive system as set forth in claim 3 including amplifier means connected to amplify said unbalance current.

6. In a servo drive system, the combination comprising, amplifier circuit means having signal input means and signal output means, balanced circuit means including one element connected with a controlled device so that a variation from a predetermined position develops a differential current, a reference source of electrical potential to produce a reference current, circuit means for comparing said differential current with said reference current to produce an unbalance current when said variation from a predetermined position occurs, connection means for connecting said unbalance current to said signal input means so that the phase of the input signal will depend upon the variation from said predetermined position, and at least one power transistor connected to operate in a switching mode in response to said unbalance current to drive an A.C. servo motor coupled to said controlled device.

7. In a servo drive system, the combination comprising, an A.C. servo motor having field winding means, means to connect a source of reference field current to said field winding means, control circuit means to develop a current in said field winding means the phase of which relative to said reference field current will cause rotation of said servo motor in a predetermined manner, and a plurality of power transistors connected in a switching mode to produce the phase in the current of said control circuit means.

8. In a servo drive system as set forth in claim 7 including an impedance matching transformer to couple a source of unbalance current to said control circuit means.

9. In a servo drive system as set forth in claim 8 including two secondary windings on said impedance matching transformer, each winding having two spaced apart terminals connected to the base of a power transistor and a center tap connected to another terminal of two power transistors, and means connecting the outputs of all said power transistors to said field winding means so that the phase of the current output from said power transistors relative to the phase of said reference field current to cause said rotation of said servo motor in a predetermined manner.

10. In a servo drive system as set forth in claim 9 including inductor means coupled with said power transistors for reducing current surges.

References Cited in the file of this patent

UNITED STATES PATENTS

| | | |
|---|---|---|
| 1,291,386 | Brackett | Jan. 14, 1919 |
| 2,439,891 | Hornfeck | Apr. 20, 1948 |
| 2,440,600 | Crosby | Apr. 27, 1948 |
| 2,475,132 | Ergen | July 5, 1949 |
| 2,475,576 | Wild et al. | July 5, 1949 |
| 2,508,082 | Wald | May 16, 1950 |
| 2,583,339 | Mouzon | Jan. 22, 1952 |
| 2,732,520 | Counault | Jan. 24, 1956 |
| 2,760,132 | Pawley | Aug. 21, 1956 |
| 2,837,662 | Ehret | June 3, 1958 |
| 2,888,622 | Mooers | May 26, 1959 |
| 2,921,247 | Morrison | Jan. 12, 1960 |